(No Model.)

J. J. NAREGANG.
BALL BEARING.

No. 578,496. Patented Mar. 9, 1897.

Witnesses

Inventor
John J. Naregang,
By
Attorney

UNITED STATES PATENT OFFICE.

JOHN J. NAREGANG, OF LEESPORT, PENNSYLVANIA.

BALL-BEARING.

SPECIFICATION forming part of Letters Patent No. 578,496, dated March 9, 1897.

Application filed October 31, 1896. Serial No. 610,717. (No model.)

*To all whom it may concern:*

Be it known that I, JOHN J. NAREGANG, a citizen of the United States, residing at Leesport, in the county of Berks and State of Pennsylvania, have invented certain new and useful Improvements in Ball-Bearings; and I do hereby declare the following to be a full, clear, and exact description of the invention, such as will enable others skilled in the art to which it appertains to make and use the same.

This invention relates to improvements in ball-bearings for bicycles or other vehicles.

The object of the invention is to provide a bearing in which the balls are always visible.

Heretofore ball-bearings have been made in which a removable cap is provided, and by the removal of this cap the balls are exposed to view.

In my present invention it is not necessary to remove any part of the bearing, as the balls are visible through the transparent portion of the cap.

The invention is more fully described in the following specification and is clearly shown in the accompanying drawings.

Figure 1:
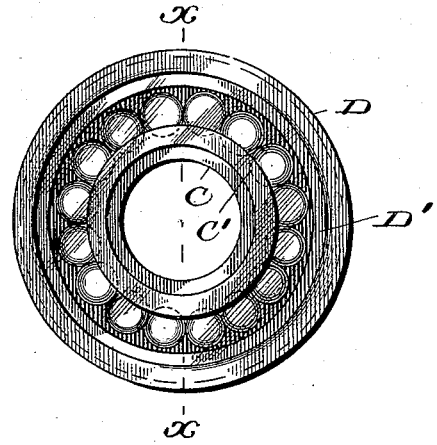
Figure 2:
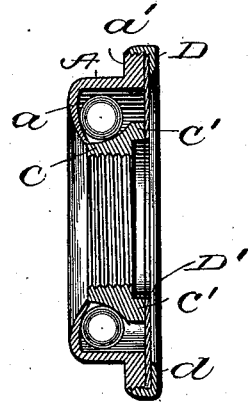
Figure 3:
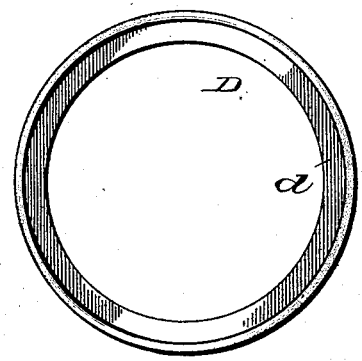
Figure 4:
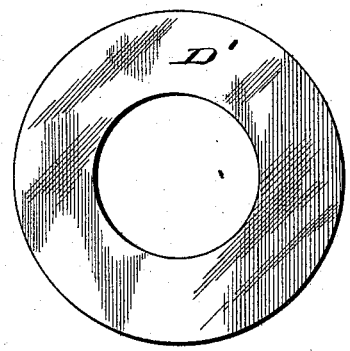

Figure 1 is an end view of the bearing embodying my invention. Fig. 2 is a sectional view on line $x\ x$ of Fig. 1. Figs. 3 and 4 are detail views of the cap and glass.

The cup A is made in the usual form with an annular space $a$, in which the balls travel.

The cone C rests against the balls and helps to form the annular space $a$, the balls bearing against the curved surface thereof, as usual.

The top $c$ of the cone instead of being made to fit snugly in the cup A is made with a small offset or bead $c'$ around its outer end just sufficiently large to keep the balls in their place without hiding them from view.

The cup is screw-threaded around the outside of its projecting edge $a'$, and a cap D is screwed thereon. This cap D is made in the form of a ring and is screw-threaded on its inside and is provided with an annular ledge or flange $d$, adapted to receive and retain in position a circular disk D′, made of glass, celluloid, mica, or other translucent material.

When the cap is in position, the translucent disk covers the space between the cone C and the inner surface of the cup A, and while it forms a comparatively tight cap it leaves the balls visible at all times.

The simplicity and effectiveness of this construction are apparent. There is nothing to remove when it is desired to view the interior of the bearing, which is often desirable, as it is continually visible through the transparent cap.

Having thus fully described my invention, what I claim, and desire to secure by Letters Patent, is—

1. The herein-described improved ball-bearing, comprising a cup-like member, a bearing-cone located within said cup-like member, an annular space being formed between the periphery of the latter and the inner wall of said cup-like member, balls adapted to travel in said annular space, a disk of translucent material adapted to cover said annular space, and a ring adapted to engage said cup-like member and secure said disk in position, as and for the purpose set forth.

2. The herein-described improved ball-bearing, comprising a cup-like member, a bearing-cone located within said cup-like member and having an annular bead, an annular space being formed between said bead and the inner periphery of said cup-like member, balls adapted to travel in said annular space, a disk of translucent material adapted to cover said annular space, and a ring adapted to receive said disk and bind the same against the rear face of said cup-like member and the bead of said cone, as set forth.

3. The herein-described improved ball-bearing, comprising a cup-like member having an annular threaded flange, a bearing-cone located within said cup-like member and having an annular bead, an annular space being formed between said bead and the inner periphery of said cup-like member, balls adapted to travel in said annular space, a disk of translucent material adapted to cover said annular space, and a threaded ring adapted to engage the threaded flange of said cup-like member and provided with a ledge or flange adapted to receive said translucent disk, substantially as and for the purpose set forth.

In testimony whereof I affix my signature in presence of two witnesses.

JOHN J. NAREGANG.

Witnesses:
 KEYSER FRY,
 H. H. KALBACH.